United States Patent [19]
Kato

[11] Patent Number: 5,557,446
[45] Date of Patent: Sep. 17, 1996

[54] OPTICAL SCANNING APPARATUS HAVING TILTED SCANNING LENS SYSTEM

[75] Inventor: Manabu Kato, Kawasaki, Japan

[73] Assignee: Canon Kabushiki Kaisha, Tokyo, Japan

[21] Appl. No.: 44,070

[22] Filed: Apr. 8, 1993

[30] Foreign Application Priority Data

| Apr. 17, 1992 | [JP] | Japan | 4-098058 |
| Feb. 4, 1993 | [JP] | Japan | 5-017539 |

[51] Int. Cl.⁶ .................................................. G02B 26/08
[52] U.S. Cl. ........................... 359/206; 359/217; 250/236
[58] Field of Search ........................... 359/196, 216–219, 359/206–207; 250/234–236; 358/494

[56] References Cited

U.S. PATENT DOCUMENTS

| 3,961,838 | 6/1976 | Zanoni | 359/221 |
| 4,213,690 | 7/1980 | Sugiura et al. | 355/8 |
| 4,248,495 | 2/1981 | Minoura | 359/206 |
| 4,585,296 | 4/1986 | Minoura et al. | 359/218 |
| 4,586,782 | 5/1986 | Sakuma et al. | 359/216 |
| 4,863,227 | 9/1989 | Takanashi | 359/207 |
| 5,064,260 | 11/1991 | Shiraishi | 359/205 |
| 5,095,383 | 3/1992 | Omura et al. | 359/216 |
| 5,111,219 | 5/1992 | Makino | 346/108 |
| 5,162,938 | 11/1992 | Iima et al. | 359/216 |
| 5,179,465 | 1/1993 | Kondo | 359/218 |
| 5,189,546 | 2/1993 | Iizuka | 359/217 |

FOREIGN PATENT DOCUMENTS

| 431603 | 6/1991 | European Pat. Off. . | |
| 58-105117 | 6/1983 | Japan . | |
| 63-033060 | 2/1988 | Japan . | |
| 1-211718 | 8/1989 | Japan | 359/207 |
| 1211718 | 8/1989 | Japan | 359/207 |
| 2-047541 | 2/1990 | Japan . | |

*Primary Examiner*—David C. Nelms
*Assistant Examiner*—Andrew Q. Tran
*Attorney, Agent, or Firm*—Fitzpatrick, Cella, Harper & Scinto

[57] ABSTRACT

In an optical scanning apparatus, there are arranged a light source, a first optical system for converting a light beam emitted from the light source to a convergent light beam, a deflector for deflecting the convergent light beam from the first optical system, and a second optical system for image-forming the convergent light beam deflected by the deflector as a spot on a surface to be scanned. The symmetrical axis of the second optical system with respect to a main-scanning direction is disposed so as to have an inclination relative to a normal to the scanned surface in a main-scan cross section. As a result, aberrations of the optical scanning apparatus, especially degradation of fθ characteristics due to backward and forward movement of a mirror surface caused by the rotation of the polygon mirror, which occur in an optical scanning system wherein a convergent, light beam is caused to enter the polygon mirror, are reduced.

60 Claims, 10 Drawing Sheets

OPTICAL SCANNING APPARATUS HAVING TILTED SCANNING LENS SYSTEM

BACKGROUND OF THE INVENTION

1. Field of the Invention

The present invention relates to an optical scanning apparatus, and particularly to an optical scanning apparatus usable in an apparatus with an electrophotographic process, such as a laser beam printer and a digital copying or duplicating machine, in which a light beam is scanningly deflected by a deflector onto a surface to be scanned through an fθ lens to record picture information on the scanned surface.

2. Related Background Art

Conventionally, a light beam emitted from a light source means is modulated according to a modulation signal in an optical scanning apparatus such as a laser beam printer (LBP). The modulated light beam is periodically deflected by an optical deflector such as a rotating polygon mirror, the deflected beam is condensed into a spot by an image-forming optical system having fθ characteristics and a photosensitive recording medium is scanned with the condensed spot to record picture information thereon.

FIG. 1 schematically shows a prior art optical scanning system, and this figure is a cross-sectional view taken along or with respect to a main-scanning direction. In FIG. 1, a diverging light beam emitted from a light source means 1 is collimated by a collimator lens 12, and the collimated light beam is restricted or limited by a stop 3 to be incident on a cylindrical lens 4. Along the main-scan direction, the collimated light beam incident on the cylindrical lens 4 passes therethrough as it is, i.e. without any change. Along the sub-scan direction which is perpendicular to the main-scan direction, the collimated light beam is converged by the cylindrical lens 4 and is imaged as a substantially linear image on a reflection surface 5a of an optical deflector which consists of a polygon mirror.

The light beam is reflectively deflected by the reflection surface 5a of the deflector 5 and is directed to a surface 7 to be scanned through an image-forming optical system which has fθ characteristics and is disposed so that the optical axis of its lens surface is coincident with the optical axis of the optical scanning system. The optical system 16 consists of lenses 16a and 16b made of glass. The scanned surface 7 is scanned with the imaged light beam by rotating the optical deflector 5 in a direction of an arrow A.

In the prior art optical scanning apparatus, the scanning lens system 16 consisting of the two lenses 16a and 16b is used as the image-forming optical system for condensing the light beam deflected by the deflector 5 onto the scanned surface 7.

In recent years, in order to reduce the size of the optical scanning apparatus and the manufacturing cost thereof, it has been considered to make up the above-discussed scanning lens system of a single lens of synthetic resin. While the synthetic resin lens is advantageous in reducing the cost and in other points, it is difficult to make accurate the surface precision of the lens when its thickness is large.

Therefore, it is desired to thin the thickness of the lens. If the lens is thinned, however, the power of the lens is lessened to the point where the power may be insufficient to image the light beam on the surface to be scanned. Hence, it is desirable to cause a converging light beam, and not a collimated beam, to be incident on the lens for compensating for insufficient lens power. To satisfy such a requirement, it is considered effective to construct the optical scanning apparatus with a light source, a first optical system for converting a light beam from the light source to a convergent light beam, a deflector for deflecting a light beam from the first optical system, and a second optical system for imaging the convergent light beam deflected by the deflector into a spot on a scanned surface.

When the convergent light beam is caused to enter the second optical system (scanning lens), the rotational center of the deflector is determined so that a zero-percent light beam (i.e., a light beam deflected by the deflector when a center of a recording area is scanned therewith) is coincident with the optical axis of the scanning lens.

FIG. 2 shows the reason this desired relation. If the zero-percent light beam were to enter tile scanning lens with a hight H relative to the optical axis of the scanning lens, the zero-percent light beam is not imaged at the center of the recording area, but rather deviated from the center by distance h. This deviation results because the zero-percent light beam is a convergent light beam, and therefore the image of the beam is formed closer in than the focal length f of the scanning lens.

However, despite the desirability of this relation, when the rotational center of the deflector is arranged so that the zero-percent light beam is coincident with the optical axis of the scanning lens, light beams that scan peripheries of the recording area and deflected with the same angle θ relative to the zero-percent light beam are not symmetrical with each other with respect to the zero-percent light beam, as shown in FIG. 3. FIG. 3 illustrates such situation in the main-scan cross section. Because of the non-symmetry, distances from tile center of the recording area to both opposite peripheries are different from each other, that is, in FIG. 3, E<E'.

As a result, when an fθ lens designed to be symmetrical with respect to the optical axis in a main-scan cross section is used as a scanning lens, the fθ characteristic considered with the image-formed position of an on-axis or zero-percent light beam as a center will not be symmetrical with respect to a symmetrical axis of the fθ lens system in the main-scan cross section. In particular, since the fθ characteristic exhibits reverse characteristics between picture image record starting side and its opposite side, such asymmetry becomes a problem.

SUMMARY OF THE INVENTION

It is an object of the present invention to provide an optical scanning apparatus which addresses the above-discussed problem.

According to one aspect of tile optical scanning apparatus of the present invention, there are arranged a light source, a first optical system for converting a light beam emitted from the light source to a convergent light beam, a deflector for deflecting the convergent light beam from the first optical system, and a second optical system for imaging the convergent light beam deflected by the deflector as a spot on a surface to be scanned. The symmetrical axis of the second optical system with respect to a main-scanning direction is disposed so as to have an inclination relative to a normal to the scanned surface in a main-scan cross section. Here, the symmetrical axis with respect to the main-scanning direction is an optical axis.

By virtue of this arrangement, asymmetry is greatly reduced.

These advantages and others will be more readily understood in connection with the following detailed description of the preferred embodiments in conjunction with the drawings.

DESCRIPTION OF THE PREFERRED EMBODIMENT

A first embodiment of an optical scanning apparatus according to the present invention will be explained with reference to FIGS. 4 and 5 which are respectively a perspective view and a cross-sectional view (a section taken along a main-scanning direction or a main-scan cross section). Here, the main-scanning direction means a direction in which a light beam is deflection-scanned by a deflection-reflection surface of an optical deflector.

Figure 4:
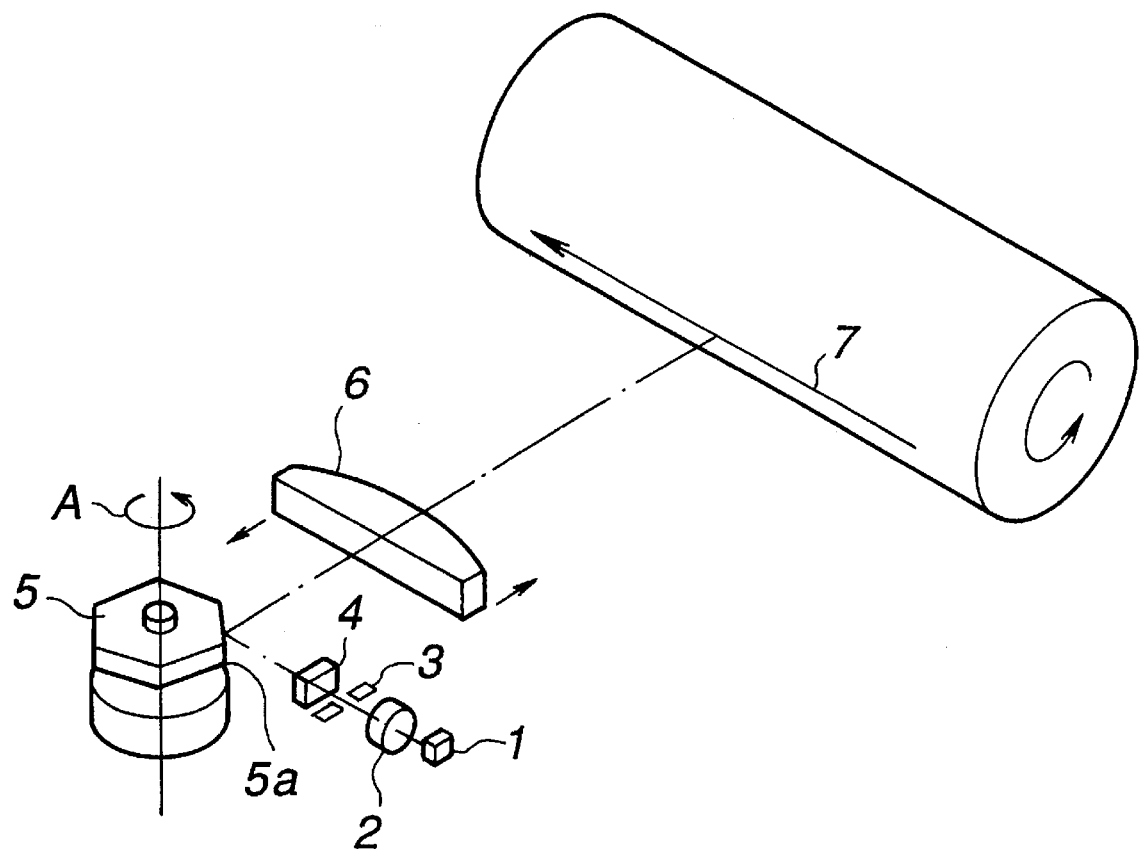
FIG. 4 is a perspective view showing the structure of a first embodiment of an optical scanning apparatus according to the present invention.
Figure 5:
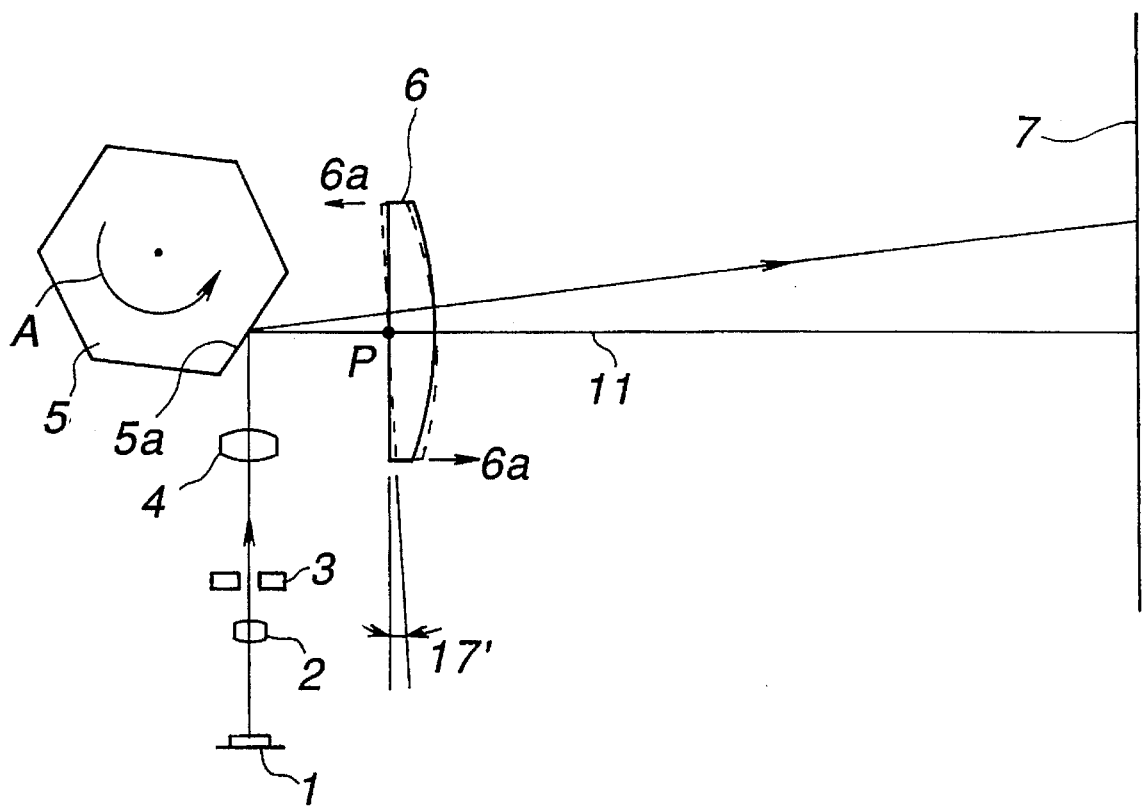
FIG. 5 is a main-scan cross-sectional view showing the first embodiment.

In FIGS. 4 and 5, reference numeral 1 designates a light source means which consists of, for example, a semiconductor laser. Reference numeral 2 denotes a condensing lens which converts a divergent light beam from the light source means 1 to a convergent light beam in the main-scan cross section. Reference numeral 3 denotes a stop for restricting a light beam or light amount. Reference numeral 4 denotes a cylindrical lens or cylinder that has a predetermined refractive power primarily only in a sub-scanning direction perpendicular to the main-scanning direction direct ion perpendicular to a sheet of FIG. 5).

Reference numeral 5 is an optical deflector that consists of a polygon mirror which is rotated in a direction of an arrow A by a driving means such as a motor. Reference numeral 6 designates an image-forming optical system or fθ lens that is made up of synthetic resin and has fθ characteristic. The fθ lens 6 consists of a single lens having different radii of curvature between the main-scanning and sub-scanning directions. Reference numeral 7 designates an image surface that is a surface to be scanned. In this structure, the condensing lens 2 shares the refractive power with the fθ lens 6 so that the refractive power of the fθ lens 6 can be reduced.

In the first embodiment, the divergent light beam emitted from the semiconductor laser (light source means) 1 is converted to the convergent light beam by the condensing lens 2, and its light amount is limited by the stop 3. Then, the convergent light beam enters the cylindrical lens 4. While the light beam in the main-scanning direction is caused to be incident on the polygon mirror (deflector) 5 as it is, the light beam in the sub-scanning direction is imaged at a position near a deflection-reflection surface 5a of the polygon mirror 5, by the cylindrical lens 4. Therefore, the light beam incident on the polygon mirror 5 is a linear image extending in the main-scanning direction.

Figure 6:
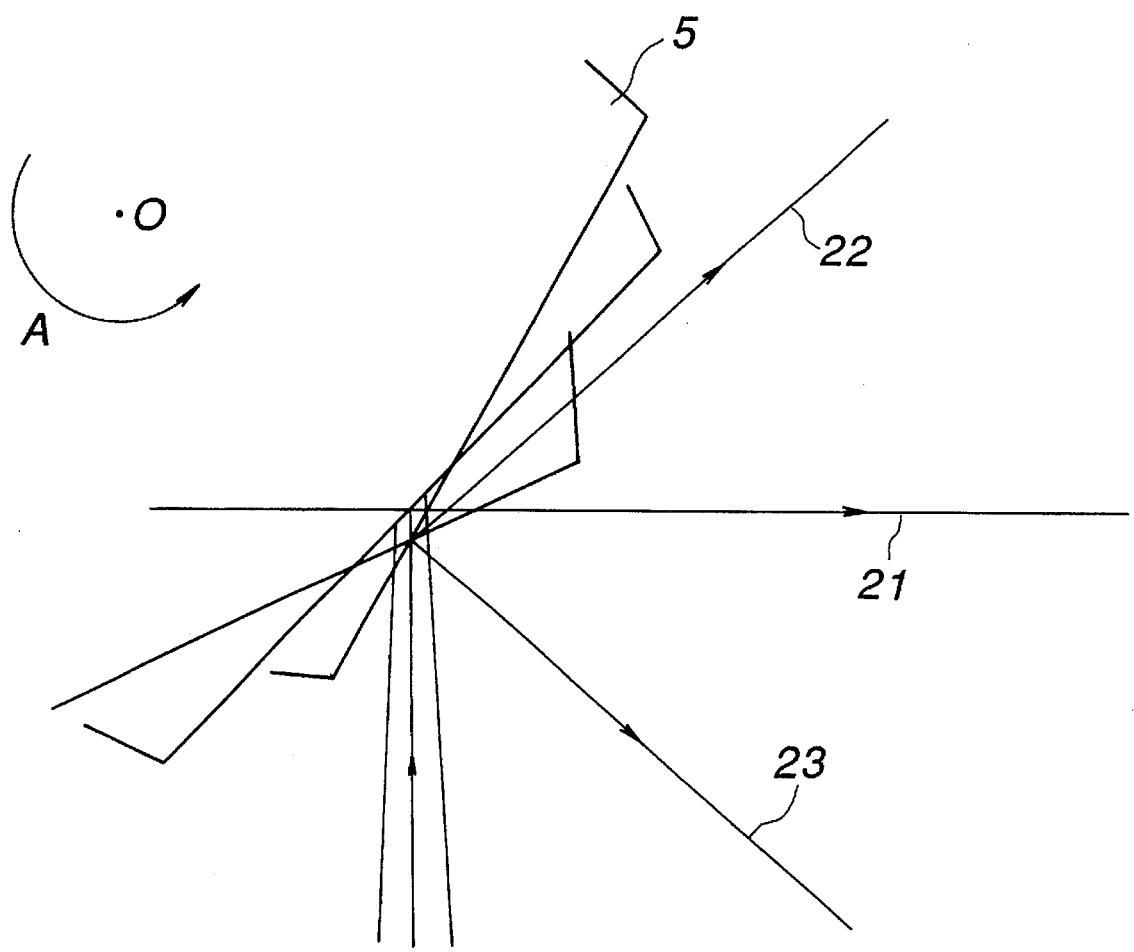
FIG. 6 is a view showing the situation of a light beam deflected by a polygon mirror due to its rotation at the time of incidence of a convergent light beam.

The light beam incident on the polygon mirror 5 is deflected as shown in FIG. 6 due to the rotation of the polygon mirror 5 in the direction of the arrow A. Since the rotational center of the polygon mirror 5 is apart from the deflection point of the light beam, the reflection surface 5a of the polygon mirror 5 moves back and forth as the polygon mirror 5 rotates and hence the deflection point of the light beam fluctuates according to a change in the deflection angle.

In FIG. 6, reference numeral 21 denotes an on-axis light beam (zero-percent light beam), reference numeral 22 denotes a positive (+) seventy-percent light beam and reference numeral 23 denotes a negative (−) seventy-percent light beam, and these beams 22 and 23 are deflected at the same angle relative to the zero-percent light beam 21 on either side thereof.

Figure 1:
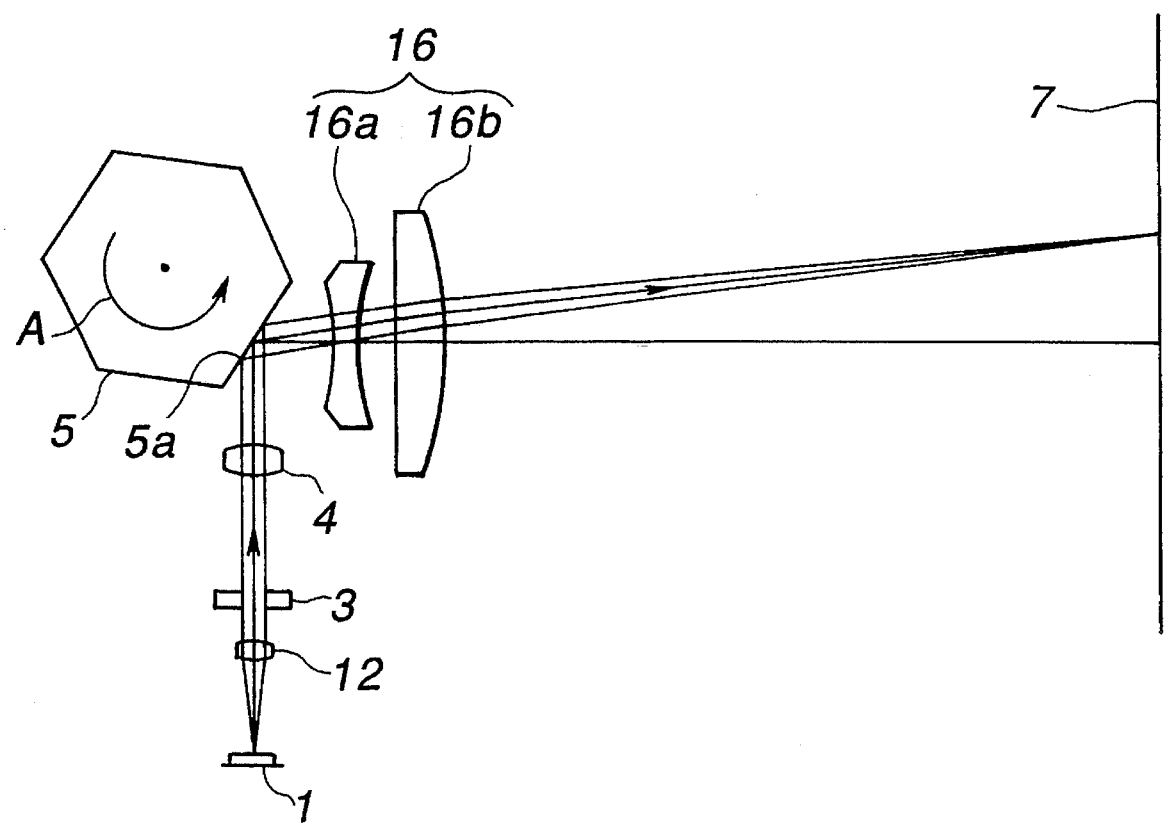
FIG. 1 is a schematic view showing the structure of a prior art optical scanning apparatus.
Figure 2:
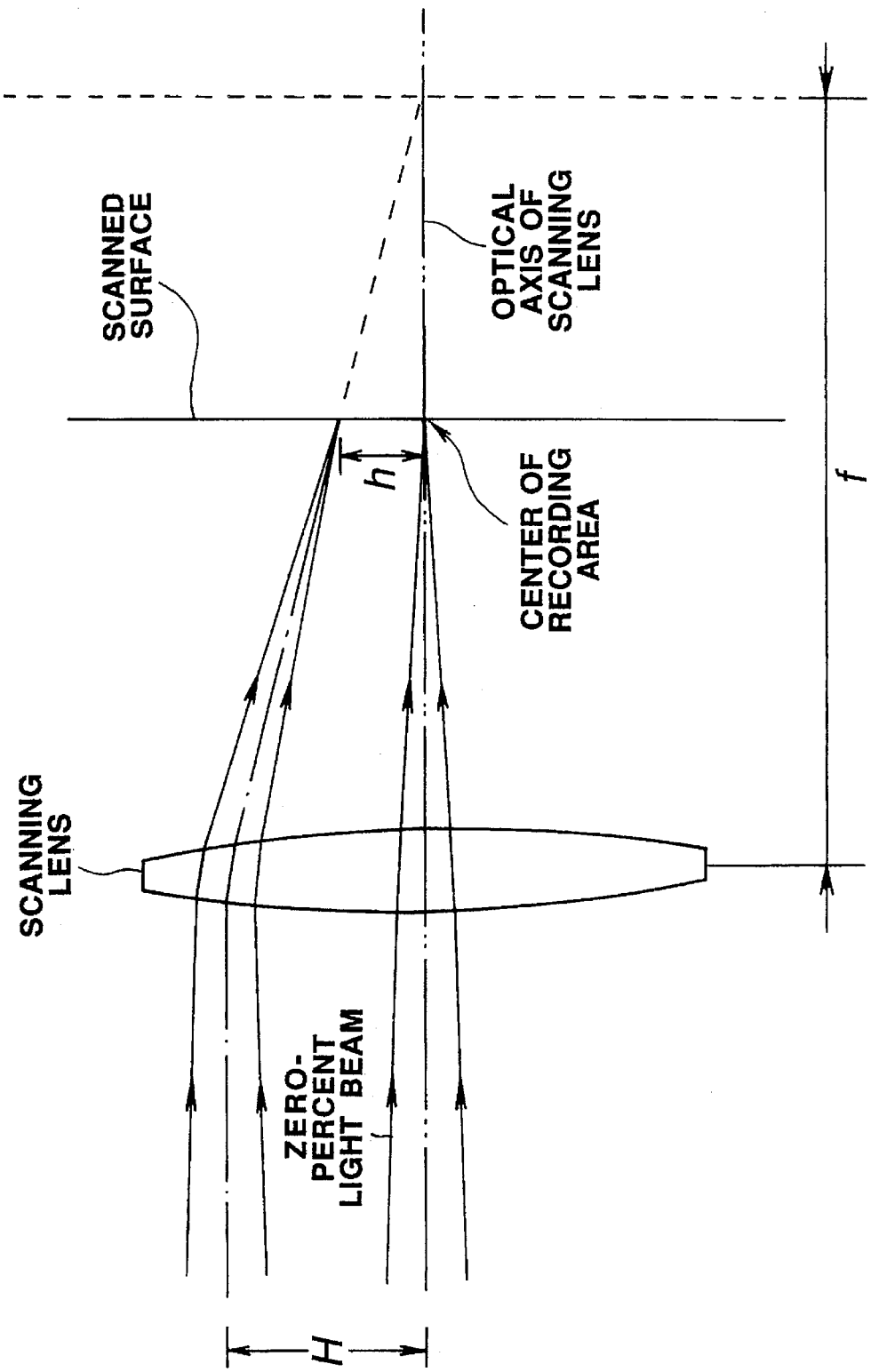
FIG. 2 is a schematic view showing the situation in which a convergent light beam is caused to be incident on a scanning lens.
Figure 3:
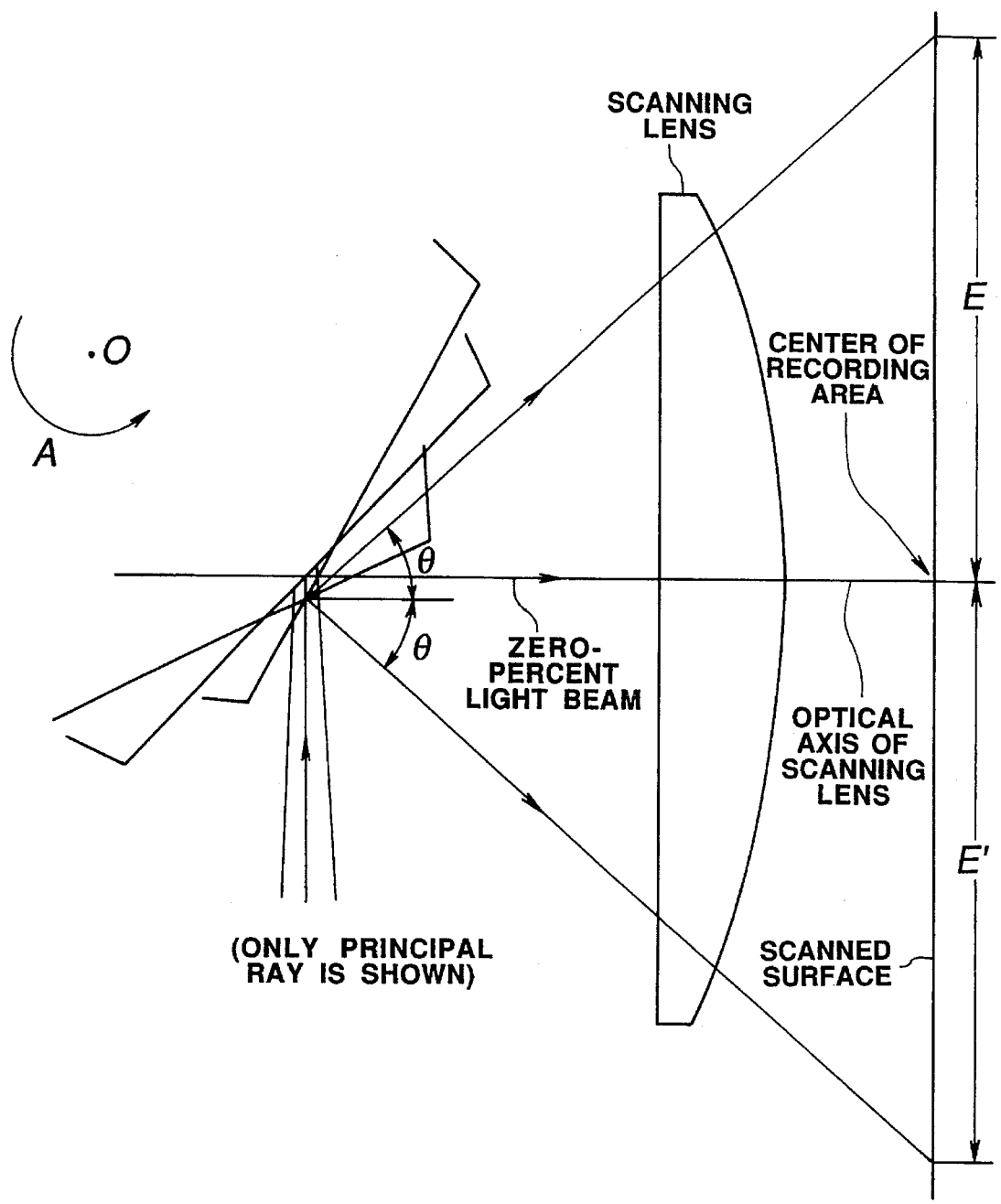
FIG. 3 is a view showing a deflection manner of a polygon mirror due to its rotation at the time of incidence of a convergent light beam.
Figure 7:
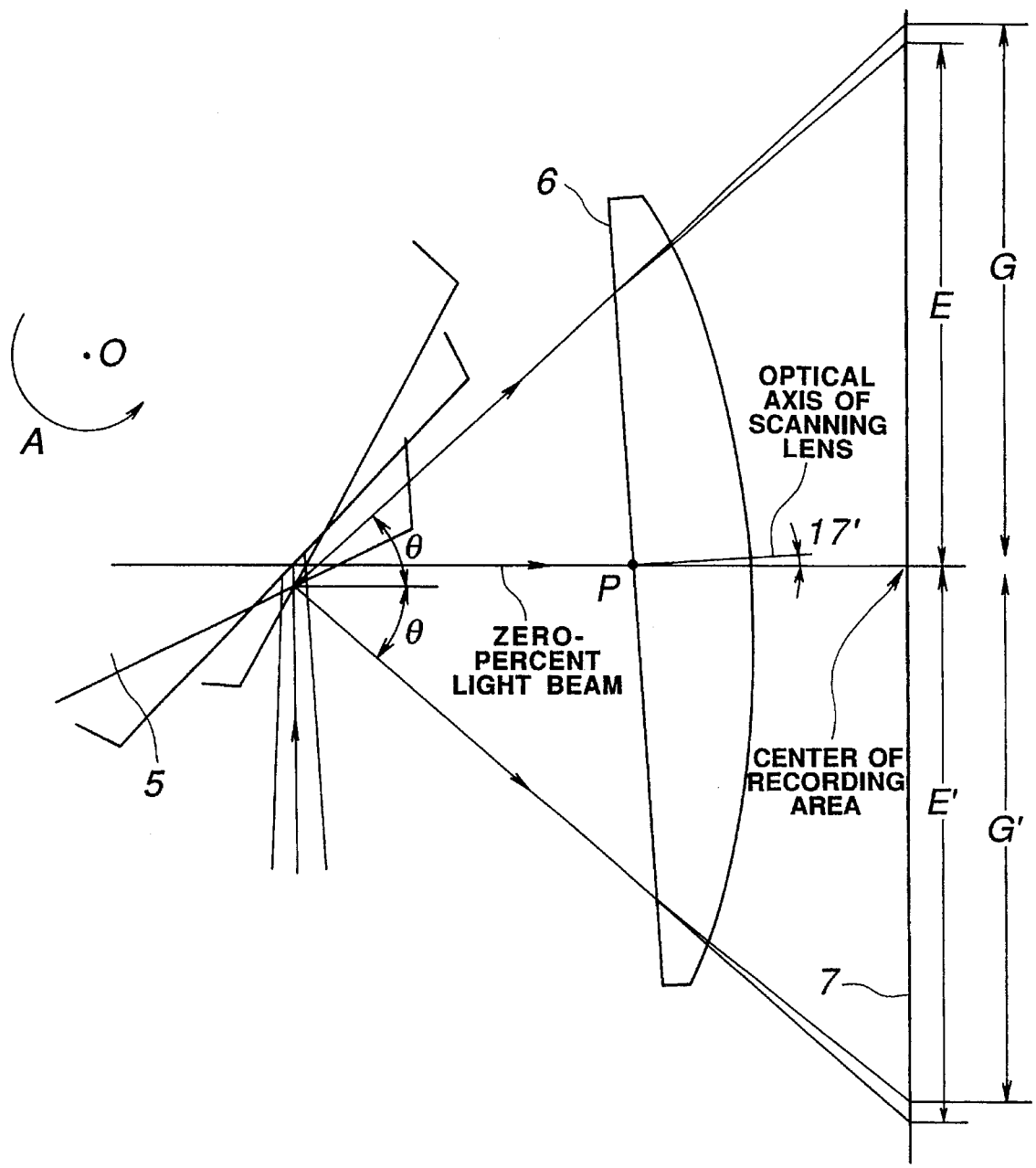
FIG. 7 is a view showing a deflection manner of a polygon mirror due to its rotation after an fθ lens is inclined.

In the first embodiment, in order to correct the asymmetry of the fθ characteristic explained in FIG. 3, the fθ lens 6 is disposed in a state in which the lens 6 is rotated by an angle of 17' in a direction of an arrow 6a in FIG. 5 in the main-scan cross section, with respect to a normal to the scanned surface 7, about a point (a point P in FIG. 5) whereat a symmetrical line (an optical axis) 11 with respect to the main-scanning direction intersects a first surface of the lens 6 facing the polygon mirror side. Due to such rotation of the fθ lens 6, distances between the center of the recording area and both opposite peripheries thereof are made equal to each other. FIG. 7 shows the situation in the main-scan cross section after the fθ lens (scanning lens) 6 is inclined. In FIG. 7, G=G' is established. Thus, the optical axis of the fθ lens 6 is inclined in the main-scan cross section relative to the normal to the scanned surface 7, so that the fθ characteristic is made symmetrical.

The convergent light beam incident on the fθ lens 6 is imaged on the scanned surface 7 by the fθ lens 6, and the scanned surface 7 is scanned with this light beam.

The convergent light beam deflected by the polygon mirror 5 enters the fθ lens 6. In the first embodiment, the fθ lens 6 consists of a single lens, and its lens surface is shaped into an aspherical surface.

The aspherical shape is as follows:

Its generating line and meridional line directions which respectively correspond to the main-scanning and sub-scanning directions are represented by the following two formulae, $$X = (Y^2/R^2)/[1+\{(1+K)(Y/R)^2\}^{1/2}] + B_4 Y^4 + B_6 Y^6 + B_1 Y^n + B_{10} Y^{10}$$

$$S = (Z^2/r)/[1+\{1-(Z/r)^2\}^{1/2}]$$

where, for example, an intersection between the fθ lens 6 and the optical axis is an original point, the optical axis direction is an X axis, an axis perpendicular to the optical axis in the main-scan cross section is a Y axis, an axis perpendicular to tile optical axis in the sub-scan cross section is a Z axis, R is a radius of curvature, K, $B_4$, $B_6$, $B_8$ and $B_{10}$ are aspherical coefficients and $r'=r(1+D_2Y^2+D_4Y^4+D_6Y^6+D_aY^6+D_aY^8+D_{10}Y^{10})$. The above formulae show that the generating line direction is an aspherical surface that can be represented by a function up to 10th order and that, the meridional line direction is a toric surface whose curvature changes according to a value of Y.

Data of an example of the fθ lens 6 of the first embodiment will be described hereinbelow. The fθ lens 6 is designed to be symmetrical in the main-scanning direction with respect to the optical axis. The working of a mold of the thus symmetrically designed fθ lens 6 is easy, and an inspection after the molding can be readily performed.

| | |
|---|---|
| Distance between polygon mirror surface and first surface of fθ lens | 29.99 mm |
| Central thickness of fθ lens | 6 mm |
| Distance between second surface of fθ lens and image surface | 106.48 mm |
| Convergence position of light beam from condensing lens when fθ lens is lacking (measured from polygon mirror surface) | 243.02 mm |
| Refractive index of fθ lens (at a wavelength of 780 nm) | 1.572 |

The shape of the fθ lens 6 is as follows:

Main-scanning direct on in
$X = (Y^2/R^2)/[1 + \{(1 + K)(Y/R)^2\}^{1/2}] + B_4Y^4 + B_6Y^6 + B_8Y^8 + B_{10}Y^{10}$

| | first surface | second surface |
|---|---|---|
| R | 2.55827E1 | 2.74984E1 |
| K | −4.54286 | −5.61058 |
| $B_4$ | −4.13566E-6 | −4.70116E-6 |
| $B_6$ | 1.25573E-9 | 1.58817E-9 |
| $B_8$ | −1.52601E-13 | −5.03924E-13 |
| $B_{10}$ | 1.97096E-17 | 1.07228E-16 |

Sub-scanning direction in
$S = (Z^2/r)/[1 + \{1 - (Z/r)^2\}^{1/2}]$
$r' = r(1 + D_2Y^2 + D_4Y^4 + D_6Y^6 + D_8Y^8 + D_{10}Y^{10})$

| | first surface Y ≥ 0 | second surface Y < 0 |
|---|---|---|
| R | −4.85374E1 | −1.20464E1 |
| $D_2$ | 1.53430E-3 | 1.47111E-3 |
| $D_4$ | −3.19837E-6 | −2.93460E-6 |
| $D_6$ | 3.44549E-9 | 2.90126E-9 |
| $D_8$ | −1.87738E-12 | −1.41851E-12 |
| $D_{10}$ | 4.01982E-16 | 2.70372E-16 |

Inclination angle of fθ lens

The fθ lens 6 is inclined by 17' in a counter-clockwise direction about the intersect ion P between the first surface of the fθ lens 6 and the optical axis, in the main-scan cross section.

Figure 8:
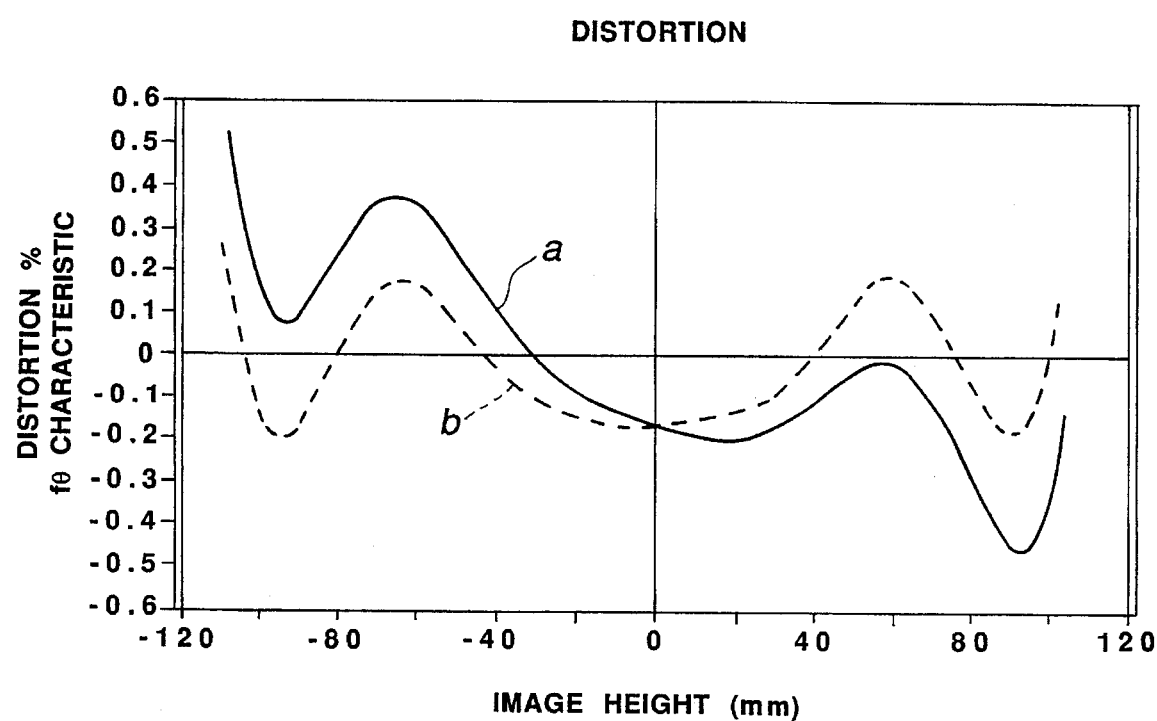
FIG. 8 is a graph illustrating fθ characteristic of the first embodiment, wherein a solid line a indicates the characteristic obtained when the fθ lens is not inclined and a dotted line indicates the characteristic when the fθ lens is inclined in a main-scan cross section.

FIG. 8 shows the fθ characteristic of the optical scanning apparatus according to the present invention. A dotted line b indicates the fθ characteristic of the first embodiment, and the fθ lens 6 is inclined by 17' in the main-scan cross section. A solid line a indicates the fθ characteristic when the fθ lens is not inclined. It can be seen from this example that the fθ characteristic accompanies the inclination when no inclination of the fθ lens is effected and that this inclination of fθ characteristic is favorably corrected by appropriately inclining the fθ lens in the main-scan cross section.

Figure 9:
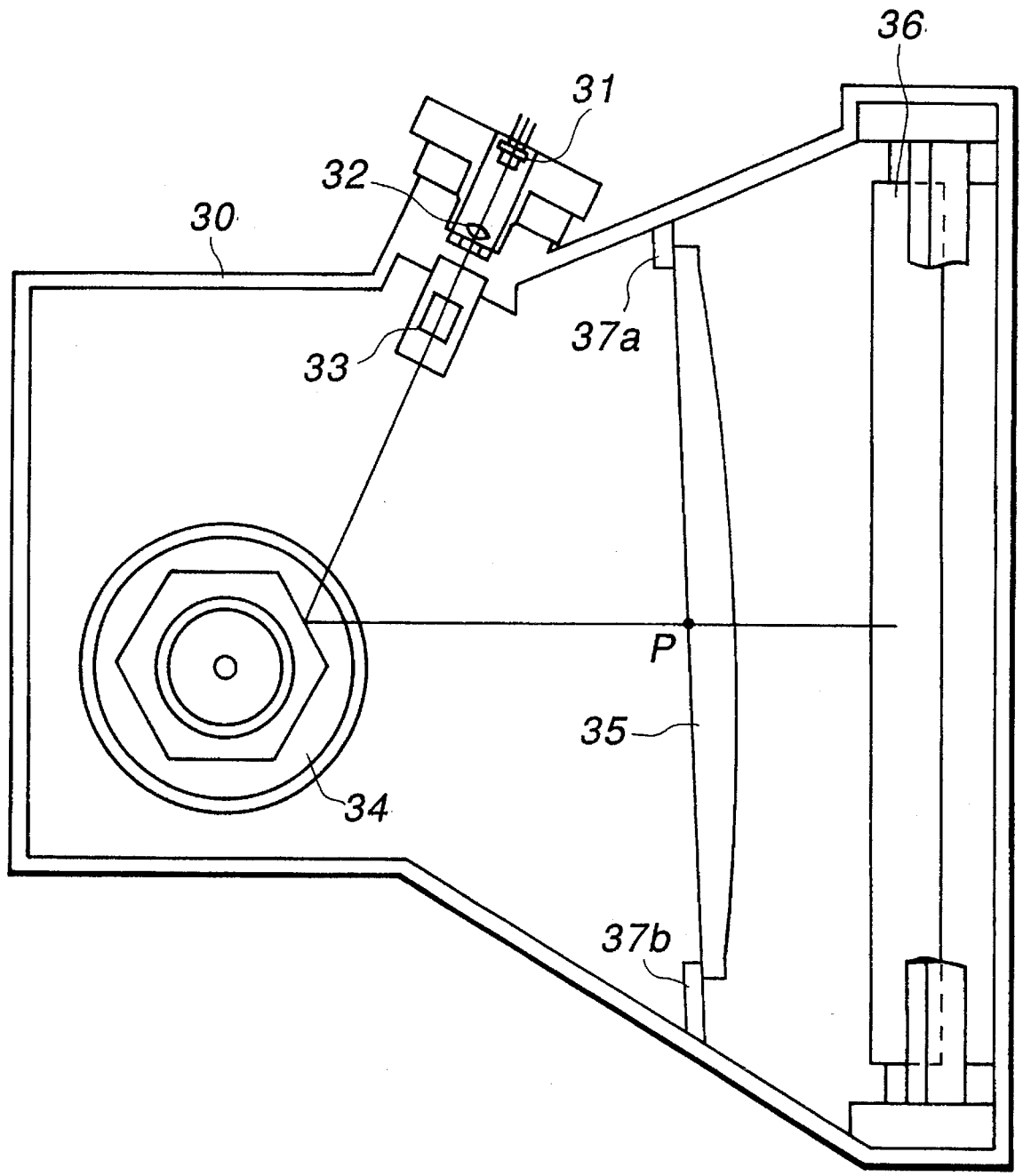
FIGS. 9 and 10 are views showing structures obtained when an optical scanning apparatus of the present invention is installed in a body of a laser beam printer.

FIG. 9 shows the structure of an embodiment in which an optical scanning apparatus of the present invention is installed in a body of a laser beam printer. FIG. 9 is a main-scan cross sectional view.

The optical scanning apparatus is mounted in an optical box 30. The optical scanning apparatus includes a semiconductor laser light source 31, a condensing lens 32 for converting a light beam emitted from the light source 31 to a convergent light beam, a cylindrical lens 33, a rotating polygon mirror 34, an fθ lens 35 and so forth. The light beam deflection-reflected by the rotating polygon mirror 34 ic caused to be incident on a reflector mirror 36 through the fθ lens 35, is reflected by the reflector mirror 36 and passes through an opening of the optical box 30. Thus, a photosensitive body (not shown) is illuminated. The optical box 30 is sealed by a lid (not shown).

The basic structure and function of the optical system are the same as those of the above-described first embodiment, so explanation thereof is omitted here. A convergent light beam which is convergent in the main-scan cross section enters the fθ lens 35. The rotating polygon mirror 34 is rotated at a constant speed by a motor (not shown), and hence a spot, which is formed by condensing the light beam from the light source 31 on the photosensitive body, is moved in the main-scanning direction. The cylindrical photosensitive body is rotated about its axis so that the sub-scanning is properly performed. Thus, an electrostatic latent image is formed on the surface of the photosensitive body.

In the neighborhood of the photosensitive body, there are arranged a corona discharger for uniformly charging the surface of the photosensitive body, a developing device for converting the electrostatic latent image formed on the surface of the photosensitive body to an explicit toner image, a transfer corona discharger for transferring the toner image onto a recording paper and so forth. Due to their functions, recording information corresponding to the light beam generated by the light source 31 is printed on the recording paper.

The optical box 30 is fixed to a support plate that is mounted to the laser beam printer body.

In this embodiment, lens mounting portions 37a and 37b are arranged in the optical box 30 in order to position the fθ lens 35 of synthetic resin in an inclined state in which the fθ lens 35 is inclined relative to the normal to the scanned surface in the main-scan cross section. These mounting portions 37a and 37b are arranged on either side of the optical axis of the lens. When the fθ lens 35 is pushed against the mounting portions 37a and 37b and fixedly positioned, tile optical axis of the fθ lens 35 which is a symmetrical axis with respect to the main-scanning direction is inclined by an angle of 17' in a counter-clockwise direction about an intersection P between the first surface of the fθ lens 35 and the optical axis, in the main-scan cross section.

In this embodiment, the reflector mirror 36 is fixed parallel with the main-scanning direction that is a scan direction of a light beam on the scanned surface, and a line connecting the mounting portions 37a and 37b is inclined relative to a direction parallel with the main-scanning direction. Further, the line connecting the mounting portions 37a and 37b is positioned so that this line is inclined relative to the mirror surface of the reflector mirror 36 in the main-scan cross section. In the main-scan cross section, the angle formed between the optical axis of the fθ lens 35 and the mirror surface is a value other than 90 degrees.

Figure 10:
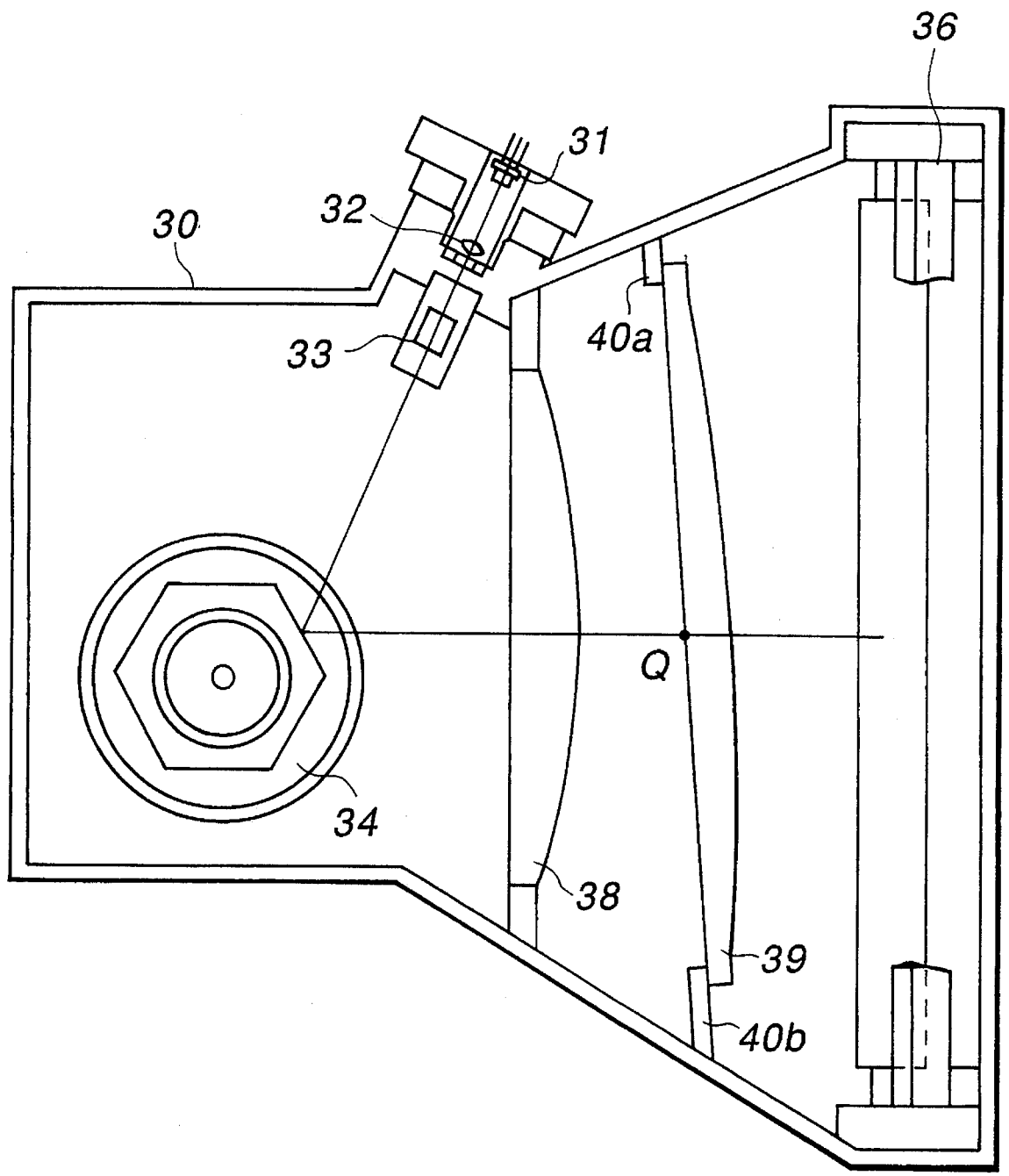

FIG. 10 shows the structure of another embodiment in which an optical scanning apparatus of the present invention is installed in a body of a laser beam printer. FIG. 10 is a main-scan cross sectional view. The basic structure and function of an optical system of this embodiment are the same as those of the embodiment shown in FIG. 9, so explanation thereof is omitted.

In this embodiment, as an image-forming optical system (fθ lens) for condensing a convergent light beam deflected by the rotating polygon mirror 34 onto the scanned surface, a lens system of a two-lens structure consisting of a spherical single lens 38 made of glass and a single lens 39 that is made of synthetic resin and has a toric surface having different refractive powers in directions orthogonal to each other, is used.

A convergent light beam in the main-scan cross section enters the fθ lens of the two-lens structure.

In this embodiment, the optical axis of the single lens 39 with the toric surface is inclined relative to the optical axis of the spherical lens 38 in the main-scan cross section, and thus these optical axes are made non-parallel to each other.

In this embodiment, lens mounting portions 40a and 40b are arranged in the optical box 30 in order to dispose the lens 39 of synthetic resin in an inclined state in which the lens 39 is inclined relative to the normal to the scanned surface in the main-scan cross section. These mounting portions 40a and 40b are arranged on either side of the optical axis of the lens. When the lens 39 is pushed against the mounting portions 40a and 40b and fixedly positioned, the optical axis of the lens 39 which is a symmetrical axis with respect to the main-scanning direction is inclined by an angle 17' in a counter-clockwise direction about an intersection Q between the incidence surface of the lens 39 and the optical axis in the main-scan cross section.

In this embodiment, the reflector mirror 36 is fixed parallel with the main-scanning direction that is a scan direction of a light beam on the scanned surface, and a line connecting the mounting portions 40a and 40b is inclined relative to a direction parallel with the main-scanning direction. Further, the line connecting the mounting portions 40a and 40b is disposed so that this line is inclined relative to the mirror surface of the reflector mirror 36 in the main-scan cross section. In the main-scan cross section, the angle formed between the optical axis of the lens 39 and the mirror surface is a value other than 90 degrees.

As is described in the foregoing, according to the present invention, the symmetrical axis with respect to the main-scanning direction of a lens for condensing a light beam deflected by a deflector onto a scanned surface is inclined relative to a normal to the scanned surface in the main-scan cross section. As a result, aberrations of an optical scanning apparatus, especially degradation of fθ characteristics due to backward and forward movement of a mirror surface caused by the rotation of a polygon mirror, which occur in an optical scanning system wherein a convergent light beam is caused to enter the polygon mirror, are reduced. Thus, an optical scanning apparatus which is capable of performing a high-precision scanning is achieved.

While the present invention has been described with respect to what is presently considered to be preferred embodiments, it is to be understood that the invention is not limited to the disclosed embodiments. The present invention is intended to cover various modifications and equivalent arrangements included within the sprit and scope of the appended claims.

What is claimed is:

1. An optical scanning apparatus comprising:
   a light source for emitting a light beam;
   a first optical system for converting the light beam from said light source to a convergent light beam;
   a deflector for deflecting the convergent light beam from said first optical system; and
   a second optical system for imaging the convergent light beam deflected by said deflector on a scanned surface as a spot, a symmetrical axis of said second optical system with respect to a main-scanning direction being inclined relative,to a normal to the scanned surface in a main-scan cross section.

2. An optical scanning apparatus according to claim 1, wherein the symmetrical axis with respect to the main-scanning direction is an optical axis.

3. An optical scanning apparatus according to claim 1, wherein said second optical system comprises a single lens.

4. An optical scanning apparatus according to claim 1, wherein said deflector is a polygon mirror and a mirror surface of said polygon mirror is flat.

5. An optical scanning apparatus comprising:
   a light source for emitting a light beam;
   a first optical system for converting the light beam from said light source to a convergent light beam;
   a deflector for deflecting the convergent light beam from said first optical system;
   a second optical system for imaging the convergent light beam deflected by said deflector on a scanned surface as a spot; and
   mounting portions for mounting said second optical system, said mounting portions being respectively disposed on either side of an optical axis of said second optical system, a line connecting between said mounting portions being inclined relative to a direction parallel with a main-scanning direction.

6. An optical scanning apparatus according to claim 4, wherein said second optical system comprises a single lens.

7. An optical scanning apparatus according to claim 5, wherein said deflector is a polygon mirror and a mirror surface of said polygon mirror is flat.

8. An optical scanning apparatus comprising:
   a light source for emitting a light beam;
   a first optical system for converting the light beam from said light source to a convergent light beam;
   a deflector for deflecting the convergent light beam from said first optical system;
   a second optical system for imaging the convergent light beam deflected by said deflector on a scanned surface as a spot; and
   a reflector mirror interposed between said second optical system and the scanned surface, an angle formed between a symmetrical axis of said second optical system with respect to a main-scanning direction and a mirror surface of said reflector mirror in a main-scan cross section having a value other than 90 degrees.

9. An optical scanning apparatus according to claim 8, wherein the symmetrical axis with respect to the main-scanning direction is an optical axis.

10. An optical scanning apparatus according to claim 8, wherein said second optical system comprises a single lens.

11. An optical scanning apparatus according to claim 8, wherein said deflector is a polygon mirror and a mirror surface of said polygon mirror is flat.

12. An optical scanning apparatus according to any one of claims 3, 6 or 10, wherein said single lens is a resin lens.

13. An optical scanning apparatus according to any one of claims 3, 6 or 10, wherein said single lens is designed to be symmetrical with respect to the optical axis.

14. An optical scanning apparatus according to any one of claims 3, 6 or 10, wherein a lens surface of said single lens is shaped into an aspherical surface.

15. An optical scanning apparatus according to any one of claims 1, 5 or 8, wherein said first optical system converts the light beam from said light source to a light beam convergent in the main-scan cross section.

16. A recording apparatus, comprising:

a light source for emitting a light beam;

a first optical system for converting the light beam from said light source to a convergent light beam;

a recording medium;

a deflector for deflecting the convergent light beam from said first optical system; and a second optical system for imaging the convergent light beam deflected by said deflector on a scanned surface of the recording medium as a spot, a symmetrical axis of said second optical system with respect to a main-scanning direction being inclined relative to a normal to the scanned surface in a main-scan cross section.

17. A recording apparatus according to claim 16, wherein the symmetrical axis with respect to the main-scanning direction is an optical axis.

18. A recording apparatus according to claim 16, wherein said second optical system comprises a single lens.

19. A recording apparatus according to claim 16, wherein said deflector is a polygon mirror and a mirror surface of said polygon mirror is flat.

20. A recording apparatus, comprising:

a light source for emitting a light beam;

a first optical system for converting the light beam from said light source to a convergent light beam;

a recording medium;

a deflector for deflecting the convergent light beam from said first optical system;

a second optical system for imaging the convergent light beam deflected by said deflector on a scanned surface of the recording medium as a spot; and mounting portions for mounting said second optical system, said mounting portions being respectively disposed on either side of an optical axis of said second optical system, a line connecting between said mounting portions being inclined relative to a direction parallel with a main-scanning direction.

21. A recording apparatus according to claim 20, wherein said second optical system comprises a single lens.

22. A recording apparatus according to claim 20, wherein said deflector is a polygon mirror and a mirror surface of said polygon mirror is flat.

23. A recording apparatus, comprising:

a light source for emitting a light beam;

a first optical system for converting the light beam from said light source to a convergent light beam;

a recording medium;

a deflector for deflecting the convergent light beam from said first optical system;

a second optical system for imaging the convergent light beam deflected by said deflector on a scanned surface of the recording medium as a spot; and a reflector mirror interposed between said second optical system and the scanned surface, an angle formed between a symmetrical axis of said second optical system with respect to a main-scanning direction and a mirror surface of said reflector mirror in a main-scan cross section having a value other than 90 degrees.

24. A recording apparatus according to claim 23, wherein the symmetrical axis with respect to the main-scanning direction is an optical axis.

25. A recording apparatus according to claim 23, wherein said second optical system comprises a single lens.

26. A recording apparatus according to claim 23, wherein said deflector is a polygon mirror and a mirror surface of said polygon mirror is flat.

27. A recording apparatus according to any one of claims 18, 21 or 25, wherein said single lens is a resin lens.

28. A recording apparatus according to any one of claims 18, 21 or 25, wherein said single lens is designed to be symmetrical with respect to the optical axis.

29. A recording apparatus according to any one of claims 18, 21 or 25, wherein a lens surface of said single lens is shaped into an aspherical surface.

30. A recording apparatus according to any one of claims 16, 20 or 23, wherein said first optical system converts the light beam from said light source to a light beam convergent in the main-scan cross section.

31. A method for scanning using an optical scanning apparatus, comprising the steps of:

deflecting a convergent light beam;

imaging the convergent light beam on a scanned surface as a spot by an optical system; and inclining a symmetrical axis of said optical system with respect to a main-scanning direction relative to a normal to the scanned surface in a main-scan cross section.

32. The method of claim 31, wherein the symmetrical axis with respect to the main-scanning direction is an optical axis.

33. The method of claim 31, wherein said optical system comprises a single lens.

34. A method according to claim 31, wherein said deflecting step deflects the convergent light beam with a polygon mirror and a mirror surface of said polygon mirror is flat.

35. A method for scanning using an optical scanning apparatus, comprising the steps of:

deflecting a convergent light beam;

imaging the convergent light beam on a scanned surface as a spot by an optical system;

disposing mounting portions for mounting said optical system respectively on either side of an optical axis of said optical system; and inclining a line connecting between said mounting portions relative to a direction parallel with a main-scanning direction.

36. The method of claim 35, wherein said optical system comprises a single lens.

37. A method according to claim 35, wherein said deflecting step deflects the convergent light beam with a polygon mirror and a mirror surface of said polygon mirror is flat.

38. A method for scanning using an optical scanning apparatus, comprising the steps of:

deflecting a convergent light beam;

imaging the convergent light beam on a scanned surface as a spot by an optical system;

interposing a reflector mirror between said optical system and the scanned surface; and disposing said optical system so that an angle formed between a symmetrical axis of said optical system with respect to a main-scanning direction and a mirror surface of said reflector mirror in a main-scan cross section has a value other than 90 degrees.

39. The method of claim 38, wherein the symmetrical axis with respect to the main-scanning direction is an optical axis.

40. The method of claim 38, wherein said optical system comprises a single lens.

41. A method according to claim 38, wherein said deflecting step deflects the convergent light beam with a polygon mirror and a mirror surface of said polygon mirror is flat.

42. The method of any one of claims 33, 36 or 40, wherein said single lens is a resin lens.

43. The method of any one of claims 33, 36 or 40, wherein said single lens is designed to be symmetrical with respect to the optical axis.

44. The method of any one of claims 33, 36 or 40, wherein a lens surface of said single lens is shaped into an aspherical surface.

45. The method of any one of claims 31, 35 or 38, wherein said deflecting step comprises deflecting the convergent light beam in the main-scan cross section.

46. A method for recording using a recording apparatus, comprising the steps of:

deflecting a convergent light beam;

imaging the convergent light beam on a scanned surface as a spot by an optical system; and inclining a symmetrical axis of said optical system with respect to a main-scanning direction relative to a normal to the scanned surface in a main-scan cross section.

47. The method of claim 46, wherein the symmetrical axis with respect to the main-scanning direction is an optical axis.

48. The method of claim 46, wherein said optical system comprises a single lens.

49. A method according to claim 46, wherein said deflecting step deflects the convergent light beam with a polygon mirror and a mirror surface of said polygon mirror is flat.

50. A method for recording using a recording apparatus, comprising the steps of:

deflecting a convergent light beam;

imaging the convergent light beam on a scanned surface as a spot by an optical system;

disposing mounting portions for mounting said optical system respectively on either side of an optical axis of said optical system; and inclining a line connection between said mounting portions relative to a direction parallel with a main-scanning direction.

51. The method of claim 50, wherein said optical system comprises a single lens.

52. A method according to claim 50, wherein said deflecting step deflects the convergent light beam with a polygon mirror and a mirror surface of said polygon mirror is flat.

53. A method for recording using a recording apparatus, comprising the steps of:

deflecting a convergent light beam;

imaging the convergent light beam on a scanned surface as a spot by an optical system;

interposing a reflector mirror between said optical system and the scanned surface; and disposing said optical system so that an angle formed between a symmetrical axis of said optical system with respect to a main-scanning direction and a mirror surface of said reflector mirror in a main-scan cross section has a value other than 90 degrees.

54. The method of claim 53, wherein the symmetrical axis with respect to the main-scanning direction is an optical axis.

55. The method of claim 53, wherein said optical system comprises a single lens.

56. A method according to claim 53, wherein said deflecting step deflects the convergent light beam with a polygon mirror and a mirror surface of said polygon mirror is flat.

57. The method of any one of claims 48, 51 or 55, wherein said single lens is a resin lens.

58. The method of any one of claims 48, 51 or 55, wherein said single lens is designed to be symmetrical with respect to the optical axis.

59. The method of any one of claims 48, 51 or 55, wherein a lens surface of said single lens is shaped into an aspherical surface.

60. The method of any one of claims 46, 50 or 53, wherein said deflecting step comprises deflecting the convergent light beam in the main-scan cross section.

* * * * *

UNITED STATES PATENT AND TRADEMARK OFFICE
CERTIFICATE OF CORRECTION

PATENT NO. : 5,557,446

DATED : September 17, 1996

INVENTOR(S) : Manabu Kato

It is certified that error appears in the above-identified patent and that said Letters Patent is hereby corrected as shown below:

Column 1, line 42, change "system" to --system 16--.

Column 2, line 16, change "tile" to --the--;
line 33, change "tile" to --the--; and
line 52, change "tile" to --the--.

Column 3, line 56, change "direct ion" to --(i.e., a direction--.

Column 4, line 62, change "$B_1Y^\alpha$" to --$B_8Y^8$--.

Column 5, line 3, change "tile" to --the--;
line 5, change "$D_6Y^6 + D_\alpha Y^6 + D_\alpha Y^8 + D_{10}Y^{10})$" to --$D_6Y^6 + D_8Y^8 + D_{10}Y^{10})$--;
line 30, change "direct on" to --direction--; and
line 55, change "intersect ion" to --intersection--.

UNITED STATES PATENT AND TRADEMARK OFFICE
CERTIFICATE OF CORRECTION

PATENT NO. : 5,557,446

DATED : September 17, 1996

INVENTOR(S) : Manabu Kato

It is certified that error appears in the above-identified patent and that said Letters Patent is hereby corrected as shown below:

Column 6, line 49, change "tile" to --the--.

Column 8, line 7, change "relative,to" to --relative to--.

Signed and Sealed this

Twenty-fifth Day of March, 1997

Attest:

BRUCE LEHMAN

*Attesting Officer*     *Commissioner of Patents and Trademarks*